UNITED STATES PATENT OFFICE.

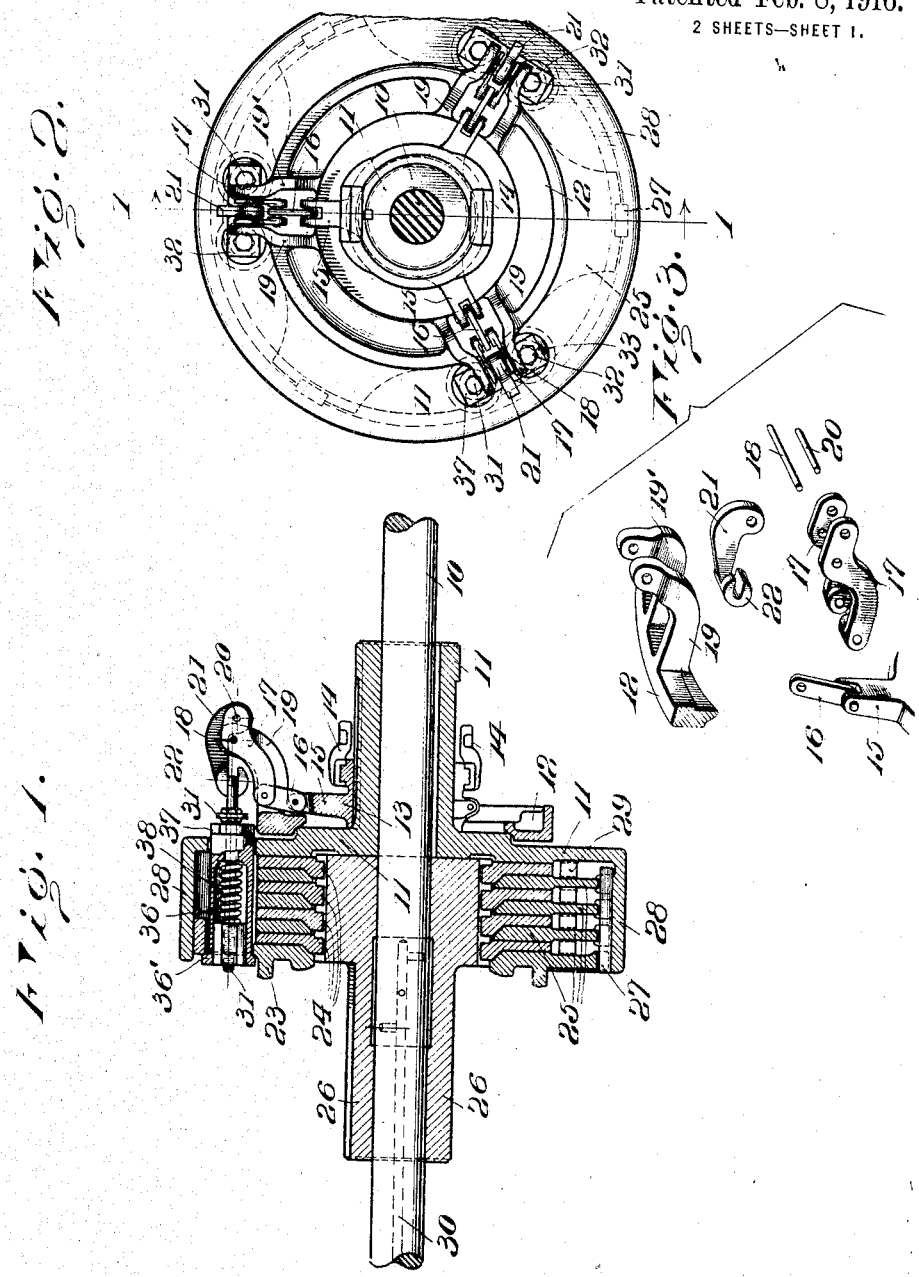
B. D. COPPAGE.
FRICTION CLUTCH.
APPLICATION FILED JULY 1, 1914.
1,171,173.
Patented Feb. 8, 1916.
2 SHEETS—SHEET 1.
WITNESSES:
INVENTOR.
Benjamin Denver Coppage
BY
Mauro, Cameron, Lewis & Massie
ATTORNEYS

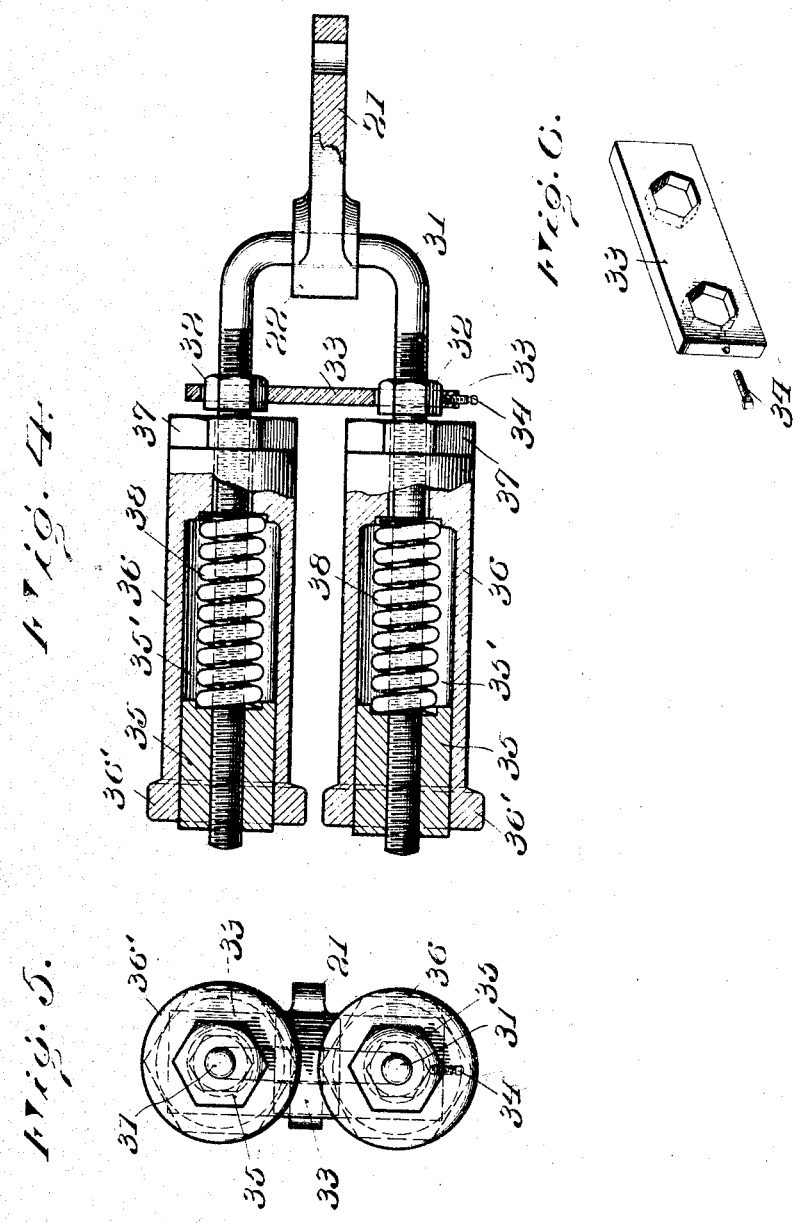

BENJAMIN DENVER COPPAGE, OF WILMINGTON, DELAWARE.

FRICTION-CLUTCH.

1,171,173.   Specification of Letters Patent.   Patented Feb. 8, 1916.

Application filed July 1, 1914. Serial No. 848,440.

*To all whom it may concern:*

Be it known that I, BENJAMIN DENVER COPPAGE, a citizen of the United States of America, and resident of Wilmington, Delaware, have invented a new and useful Improvement in Friction-Clutches, which invention is fully set forth in the following specification.

The present invention relates to friction clutches, particularly of the disk type such as shown in the patent to Faucett, No. 630,532, August 8, 1899. Friction clutches of this type, and which are closed by lever mechanism, have a great many advantages and uses, but it has been experienced that they are subject to excessive wear which greatly shortens the life of the clutch. This wear of the clutching surfaces is due either to over-adjustment on the part of the operator or expansion of the parts due to the heat generated by friction. This matter of over-adjustment is the most prolific source of trouble, and clutches of this type require the attention of careful and skilled operators, as is obvious when it is pointed out that a one-half turn of the adjusting nut on the Faucett type of clutch in common use increases the pick-up capacity of such a clutch about six times. If the clutch is large enough and is overadjusted, it may start the machinery with too great an acceleration, thereby causing shock. On the other hand, if the clutch is too small to quickly accelerate the load, the clutch disk will be cut and the adjustment will be lost by the reduction of the thickness of the clutch disk. Experience has accordingly demonstrated that clutches of this type are subject to great variations of power due to wear on the parts for the causes indicated.

The principal objects of the present invention are therefore to provide a clutch of this character which will perform its functions with practically no wear on the parts; which will not require the services of a skilled operator to prevent overadjustment; which will substantially maintain a predetermined pressure between the disks, except at the period of slipping during starting, at which time the heat generated by friction causes a temporary expansion of the disks and thereby a slight increase of pressure, which increase, however, is insufficient to lock the clutch members, although it is sufficiently high to effectively operate the clutch even though the disks should wear and become thinned from whatever cause.

The invention will be better understood by reference to the accompanying drawings, illustrating one expression of the inventive idea, and wherein:—

Figure 1 is a vertical sectional view through the improved clutch mechanism; Fig. 2 is an end elevation looking toward the left of Fig. 1; Fig. 3 is a separated perspective view of part of the mechanism by which power is applied to move the disks into clutching engagement; Fig. 4 is a horizontal sectional view, partly in elevation, of a pair of spring casings and associated mechanism; Fig. 5 is an end elevation looking toward the right of Fig. 4; and Fig. 6 is a perspective view of the nut-locking plate.

Referring to the drawings, wherein like reference numerals refer to like parts, 10 indicates a shaft on which is keyed or otherwise secured in any desired manner a relatively fixed member or hub casing 11 upon which is mounted an equalizing yoke 12, the running spool 13 and an additional spool 14. Suitable lever mechanism (not shown) is connected to the stationary spool 14, whereby the running spool 13 is caused to move longitudinally of shaft 10.

The running spool 13 is provided with a plurality of studs or projections 15, here shown as three, to the upper end of each of which is pivoted one end of a link 16, the other end of which projects between and is attached to one extremity of each of two identical levers 17. Each pair of levers 17 is pivoted on a pin 18 carried by arms 19 and 19' preferably formed integrally with the equalizing yoke 12. In the other extremities of each pair of levers 17 is mounted a pin 20 on which is pivoted one end of a link 21 which is provided at its other end with a hook 22.

The lever mechanism just described is adapted to move a suitable follower plate or follower casing 23 to force the disks into clutching engagement, through connections that will be hereinafter described. Any desired number and size of disks, according to the work to be performed, may be employed, but there are herein shown four inner disks 24 and three outer disks 25. The inner disks 24 are suitably interlocked with a clutch sleeve 26, which is loose on shaft 10, and the outer disks are engaged with keys 27 which are attached to a flange 28 on the hub casing 11. Between the disks are provided springs 29 which act to push the disks apart when the clutch is open. Preferably the shaft 10 is provided with an oil hole 30 to supply lubricant to the clutch sleeve which is stationary when the clutch is open, and on which sleeve may be keyed or otherwise secured a pulley (not shown).

The connection that is provided by the present invention between the lever mechanism above described and the follower casing 23, to force the disks into clutching engagement, is such as to eliminate the danger of wear due to overadjustment at the hands of an ignorant or careless workman, or from other cause; and with the device of the present invention, the clutch may be closed instantly, without any thought or care on the part of the operator, without any danger of shock or wear (such as encountered on disk clutches as heretofore used), and without any loss of adjustment between the parts, which adjustment is maintained constant and at a predetermined degree.

Referring particularly to Figs. 1 and 4, it will be observed that each hook 22 engages the cross member of a U-shaped member or bolt 31, both legs of which are screw-threaded for practically their entire length. Each leg carries a standard hexagonal nut 32, which nuts are held in adjusted position by means of a nut lock bar 33 (Fig. 6) secured to the nuts by a screw 34. Each leg of each bolt 31 also carries a second hexagonal nut 35 which slides within hexagonally-shaped openings 35′ in casings 36, one of said casings 36 surrounding each leg of each bolt 31. These casings project through openings in hub casing 11 and may be rotated in said openings by a wrench applied to the hexagonal end 37 of said casings 36. A helical spring 38 is contained in each casing and surrounds its associated leg of U-bolt 31, one end of said spring bearing against the casing and the other end against nut 35. Each casing is provided with a shoulder 36′ that engages the follower plate or casing 23. When casings 36 are rotated, the hexagonal nuts 35, being carried in hexagonal recesses 35′, rotate therewith and are accordingly displaced along the screw-threaded legs of the U-bolt 31, thus compressing springs 38, if the rotation of the nuts 35 is continued after the spring casings 36 contact with hexagonal nuts 32, thus placing the springs 38 under an initial tension, and accordingly adjusting the disks to the desired degree of pressure.

When now the parts are moved to effect clutching engagement, that is to say, to the position shown in Fig. 1, levers 17 will be rotated around pivots 18, thus moving each link 21, its connected U-bolt 31, and nuts 35 toward the right, whereby springs 38 are further compressed and the power is transmitted to the clutch disks through said compressed springs, casings 36, shoulders 36′ and follower plates or casings 23. This compression of the springs will be maintained by reason of the fact that the pivot 20 of each link 21 is moved into a horizontal plane below that passing through the middle of pivot 18 and the legs of bolt 31 which carry springs 38, and the parts will be maintained in this position until the toggle lever mechanism is moved in a reverse direction by stationary collar 14.

It is pointed out that, if the springs 38 have an initial tension, casings 36 will be kept in contact with nuts 32 except when the toggle lever mechanism pulls the U-bolt 31 together with nuts 32 away from the spring casings 36, which is the case when the clutch is closed. When the lever mechanism is moved in a direction opposite to that in which it was moved to effect clutching engagement between the disks, the springs 38 expand, moving nuts 35 and 32 toward the left, the latter thereby engaging its casing 36 and forcing it toward the left, thus removing shoulder 36′ from the follower casing 23 whereupon springs 29 will separate the inner disks 24 and outer disks 25, and accordingly the rotation of the driven part of the clutch will cease.

In view of the fact that the power applied to the lever mechanism is transmitted to the disks to effect clutching engagement through springs that maintain a predetermined degree of pressure between the parts, it is clear that the necessity for care or skill on the part of the operators is obviated and that the clutch may be instantly closed without danger of shock or wear. With this construction, the disks cannot be suddenly engaged, as is the case with the Faucett type of clutch, but the engagement is gradual and progressive, the springs acting to press the disks together with the requisite predetermined degree of pressure. It is pointed out that the pressure on the disks should not be so great as to either squeeze out the lubricant or evaporate the same by excessive friction, and yet should be sufficient to pick up the load and accelerate the same to full speed in a reasonable length of time, overcoming the friction of rest and the inertia of the mass, and maintaining the power or torque required to sustain the desired running speed. If this be done, the wear on the disks will be negligible and it will be necessary only to renew the lubricant from time to time.

While for the purpose of illustration, one expression of the inventive idea has been herein described with great particularity, it is to be understood that the invention is not limited to the structure shown but that the inventive idea is susceptible of various mechanical embodiments within the limits of the appended claims.

What is claimed is:—

1. In a clutch mechanism the combination of a plurality of disks, means for moving the same into clutching engagement including a lever mechanism, a spring associated with said lever mechanism through which power applied to said lever mechanism is transmitted to said disks, and means for adjusting said spring independent of changes in the path of travel of said lever mechanism.

2. In a clutch mechanism the combination of a plurality of disks, means for moving the same into clutching engagement including a plurality of lever mechanisms, a spring associated with each lever mechanism through which power applied to said lever mechanisms is transmitted to said disks, means for adjusting said springs, and stop members associated with said springs for permitting adjustments of said springs independent of changes in the paths of travel of said lever mechanisms.

3. In a clutch mechanism the combination of a plurality of disks, means for moving the same into clutching engagement including a plurality of lever mechanisms, adjustable springs associated with each lever mechanism through which power applied to said lever mechanisms is transmitted to said disks, stop members associated with the springs of each lever mechanism to prevent changes in the paths of travel of said lever mechanisms when said springs are adjusted, and locking means for said stop members.

4. In a clutch mechanism, the combination of a plurality of disks, means for moving the same into clutching engagement including a plurality of lever mechanisms, and springs associated with each lever mechanism for transmitting power to said disks, said springs being adjustable without changing the paths of travel of said lever mechanisms.

5. In a clutch mechanism, the combination of a plurality of disks, a follower plate, means moving said follower plate to force said disks into clutching engagement, said means including a plurality of lever mechanisms and a spring associated with each lever mechanism through which springs the power applied to said lever mechanisms is transmitted to said follower plate.

6. In a clutch mechanism, the combination of a relatively fixed member, a disk bearing against the same, a follower bearing against said disk, a spring associated with said follower, a casing for said spring having a part in engagement with said follower, and means for moving said follower into clutching relation with said disk said means acting through said spring and casing.

7. In a clutch mechanism, the combination of a relatively fixed member, a disk bearing against the same, a follower bearing against said disk, a spring associated with said follower, a casing for said spring having a part in engagement with said follower, and lever mechanism for moving said follower into clutching relation with said disk, said mechanism acting through said spring and casing.

8. In a clutch mechanism, the combination of a plurality of disks and means for moving the same into clutching engagement including a lever, a screw-threaded member moved thereby, a spring associated with said member, a rotatable casing for said spring engaging one of said disks, and a nut engaged by said spring and rotatable with said casing but displaceable longitudinally thereof when said casing is rotated.

9. In a clutch mechanism, the combination of a plurality of disks and means for moving the same into clutching engagement including a lever, a screw-threaded member moved thereby, a spring associated with said member, a rotatable casing for said spring engaging one of said disks, a nut engaged by said spring and rotatable with said casing but displaceable longitudinally thereof when said casing is rotated, and a second nut carried by said member engaging said casing and moving the same when the power applied through the lever is removed.

10. In a clutch mechanism, the combination of a relatively fixed member, a disk bearing against the same, a follower bearing against said disk, a spring associated with said follower, a casing for said spring having a part in engagement with said follower, and means adapted by rotation of said casing to adjust and determine the initial tension of the spring, and means for moving said follower into clutching relation with said disk said means acting through said spring and placing the same under further tension.

11. In a clutch mechanism, the combination of a relatively fixed member, a disk bearing against the same, a follower bearing against said disk, and means for moving said follower into clutching relation with said disk said means including a plurality of lever mechanisms, a U-shaped member movable by each lever mechanism, each leg of said U-shaped member being screw-threaded, a spring surrounding each leg, a rotatable casing for each spring and which is engaged by one end of said spring, a nut on each leg rotatable with said casing but displaceable longitudinally thereof and bearing against the other end of said spring, each casing engaging said follower.

12. In a clutch mechanism, the combination of a relatively fixed member, a disk bearing against the same, a follower bearing against the disk, a plurality of lever mechanisms for moving said follower into clutching relation with said disk, a U-shaped member movable by each lever mechanism each leg of said U-shaped member being screw-threaded, a spring surrounding each leg, a rotatable casing for each spring and which is engaged by one end of said spring, a nut on each leg rotatable with said casing but displaceable longitudinally thereof and bearing against the other end of said spring, each casing being in operative relation with said follower, and a second nut carried by each leg and engaging its casing to move the same when the parts are moved out of clutching engagement.

13. In a clutch mechanism, the combination of a relatively fixed member, a disk bearing against the same, a follower plate bearing against said disk, and means for moving said follower into clutching engagement with said disk, said means including a pivoted lever, a link pivotally connected to said lever, and a spring through which the power applied to said lever is transmitted to said follower plate, the pivotal point between said link and lever when the clutch is closed being in a horizontal plane below that passing through the pivot of said lever.

In testimony whereof I have signed this specification in the presence of two subscribing witnesses.

BENJAMIN DENVER COPPAGE.

Witnesses:
H. J. FEENEY,
GEO. E. SANDS.